(12) United States Patent
Morales, Jr.

(10) Patent No.: US 6,539,957 B1
(45) Date of Patent: Apr. 1, 2003

(54) EYEWEAR CLEANING APPARATUS

(76) Inventor: Abel Morales, Jr., 2123 Dewberry La., Pasadena, TX (US) 77502

( * ) Notice: Subject to any disclaimer, the term of this patent is extended or adjusted under 35 U.S.C. 154(b) by 85 days.

(21) Appl. No.: 09/944,016

(22) Filed: Aug. 31, 2001

(51) Int. Cl.$^7$ ................................................ B08B 3/02
(52) U.S. Cl. .................... 134/95.2; 134/95.3; 134/186; 134/190; 134/191; 134/199
(58) Field of Search ............................. 134/95.2, 95.3, 134/186, 190, 191, 199

(56) References Cited

U.S. PATENT DOCUMENTS

| | | |
|---|---|---|
| 3,259,139 A | 7/1966 | Bell et al. |
| 4,034,432 A | 7/1977 | Sullivan |
| D315,813 S | 3/1991 | Nelson |
| 5,143,101 A | 9/1992 | Mor |
| 5,794,635 A | 8/1998 | Maines |
| 5,890,503 A | 4/1999 | Bowen |
| 6,338,350 B1 * | 1/2002 | Ewen ................... 134/95.2 X |

FOREIGN PATENT DOCUMENTS

WO        94/22041    * 9/1994   .................. 134/191

* cited by examiner

*Primary Examiner*—Philip R. Coe

(57) ABSTRACT

An eyewear cleaning apparatus for removing particles from the lenses of eyewear includes a housing having a bottom wall, and an outer wall including a first end wall, a second end wall, a first side wall and a second side wall. A compartment is positioned in the housing adjacent to the first end wall. A pump is positioned in the compartment. A container is positioned in the compartment and is fluidly coupled to the pump. A delivery pipe is fluidly coupled, to the pump and extends around the interior of the housing. A first pair of nozzles is in communication with the delivery pipe and extend toward the second end wall. A second pair of nozzles is in communication with the delivery pipe and extend toward the first end wall. A first mount is positioned in the housing and is adapted for receiving a bridge portion of eyewear.

8 Claims, 5 Drawing Sheets

EYEWEAR CLEANING APPARATUS

BACKGROUND OF THE INVENTION

1. Field of the Invention

The present invention relates to eyewear cleaning devices and more particularly pertains to a new eyewear cleaning apparatus for removing particles from the lenses of eyewear.

2. Description of the Prior Art

The use of eyewear cleaning devices is known in the prior art. More specifically, eyewear cleaning devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,794,635; U.S. Pat. No. 5,143,101; U.S. Pat. No. 5,890,503; U.S. Pat. No. 4,034,432; U.S. Pat. No. 3,259,139; and U.S. Des. Pat. No. 315,813.

While these devices fulfill their respective, particular objectives and requirements, the aforementioned patents do not disclose a new eyewear cleaning apparatus. The inventive device includes a housing having a bottom wall, and an outer wall including a first end wall, a second end wall, a first side wall and a second side wall extending upwardly from the bottom wall. A compartment is positioned in the housing and is positioned adjacent to the first end wall. A pump is positioned in the compartment. A container for holding a fluid is positioned in the compartment and is fluidly coupled to the pump. A delivery pipe is fluidly coupled to the pump and extends around the interior of the housing and is positioned adjacent to the outer wall and the container. A first pair of nozzles is in communication with the delivery pipe. The first pair of nozzles are spaced from each other and extend toward the second end wall. A second pair of nozzles is in communication with the delivery pipe. The second pair of nozzles are spaced from each other and extend toward the first end wall. An upper wall extends over the compartment and has an opening extending therethrough and into the container. A first mount is positioned in the housing and is adapted for receiving a bridge portion of eyewear. A cover is hingedly coupled to an upper edge of the outer wall for selectively opening and closing the housing.

In these respects, the eyewear cleaning apparatus according to the present invention substantially departs from the conventional concepts and designs of the prior art, and in so doing provides an apparatus primarily developed for the purpose of removing particles from the lenses of eyewear.

SUMMARY OF THE INVENTION

In view of the foregoing disadvantages inherent in the known types of eyewear cleaning devices now present in the prior art, the present invention provides a new eyewear cleaning apparatus construction wherein the same can be utilized for removing particles from the lenses of eyewear.

The general purpose of the present invention, which will be described subsequently in greater detail, is to provide a new eyewear cleaning apparatus apparatus and method which has many of the advantages of the eyewear cleaning devices mentioned heretofore and many novel features that result in a new eyewear cleaning apparatus which is not anticipated, rendered obvious, suggested, or even implied by any of the prior art eyewear cleaning devices, either alone or in any combination thereof.

To attain this, the present invention generally comprises a housing having a bottom wall, and an outer wall including a first end wall, a second end wall, a first side wall and a second side wall extending upwardly from the bottom wall. A compartment is positioned in the housing and is positioned adjacent to the first end wall. A pump is positioned in the compartment. A container for holding a fluid is positioned in the compartment and is fluidly coupled to the pump. A delivery pipe is fluidly coupled to the pump and extends around the interior of the housing and is positioned adjacent to the outer wall and the container. A first pair of nozzles is in communication with the delivery pipe. The first pair of nozzles are spaced from each other and extend toward the second end wall. A second pair of nozzles is in communication with the delivery pipe. The second pair of nozzles are spaced from each other and extend toward the first end wall. An upper wall extends over the compartment and has an opening extending therethrough and into the container. A first mount is positioned in the housing and is adapted for receiving a bridge portion of eyewear. A cover is hingedly coupled to an upper edge of the outer wall for selectively opening and closing the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new eyewear cleaning apparatus apparatus and method which has many of the advantages of the eyewear cleaning devices mentioned heretofore and many novel features that result in a new eyewear cleaning apparatus which is not anticipated, rendered obvious, suggested, or even implied by any of the prior art eyewear cleaning devices, either alone or in any combination thereof.

It is another object of the present invention to provide a new eyewear cleaning apparatus which may be easily and efficiently manufactured and marketed.

It is a further object of the present invention to provide a new eyewear cleaning apparatus which is of a durable and reliable construction.

An even further object of the present invention is to provide a new eyewear cleaning apparatus which is susceptible of a low cost of manufacture with regard to both materials and labor, and which accordingly is then susceptible of low prices of sale to the consuming public, thereby making such eyewear cleaning apparatus economically available to the buying public.

Still yet another object of the present invention is to provide a new eyewear cleaning apparatus which provides in the apparatuses and methods of the prior art some of the advantages thereof, while simultaneously overcoming some of the disadvantages normally associated therewith.

Still another object of the present invention is to provide a new eyewear cleaning apparatus for removing particles from the lenses of eyewear.

Yet another object of the present invention is to provide a new eyewear cleaning apparatus which includes a housing having a bottom wall, and an outer wall including a first end wall, a second end wall, a first side wall and a second side wall extending upwardly from the bottom wall. A compartment is positioned in the housing and is positioned adjacent to the first end wall. A pump is positioned in the compartment. A container for holding a fluid is positioned in the compartment and is fluidly coupled to the pump. A delivery pipe is fluidly coupled to the pump and extends around the interior of the housing and is positioned adjacent to the outer wall and the container. A first pair of nozzles is in communication with the delivery pipe. The first pair of nozzles are spaced from each other and extend toward the second end wall. A second pair of nozzles is in communication with the delivery pipe. The second pair of nozzles are spaced from each other and extend toward the first end wall. An upper wall extends over the compartment and has an opening extending therethrough and into the container. A first mount is positioned in the housing and is adapted for receiving a bridge portion of eyewear. A cover is hingedly coupled to an upper edge of the outer wall for selectively opening and closing the housing.

Still yet another object of the present invention is to provide a new eyewear cleaning apparatus that uses water pressure and air to clean eyewear to prevent scratches to the eyewear.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
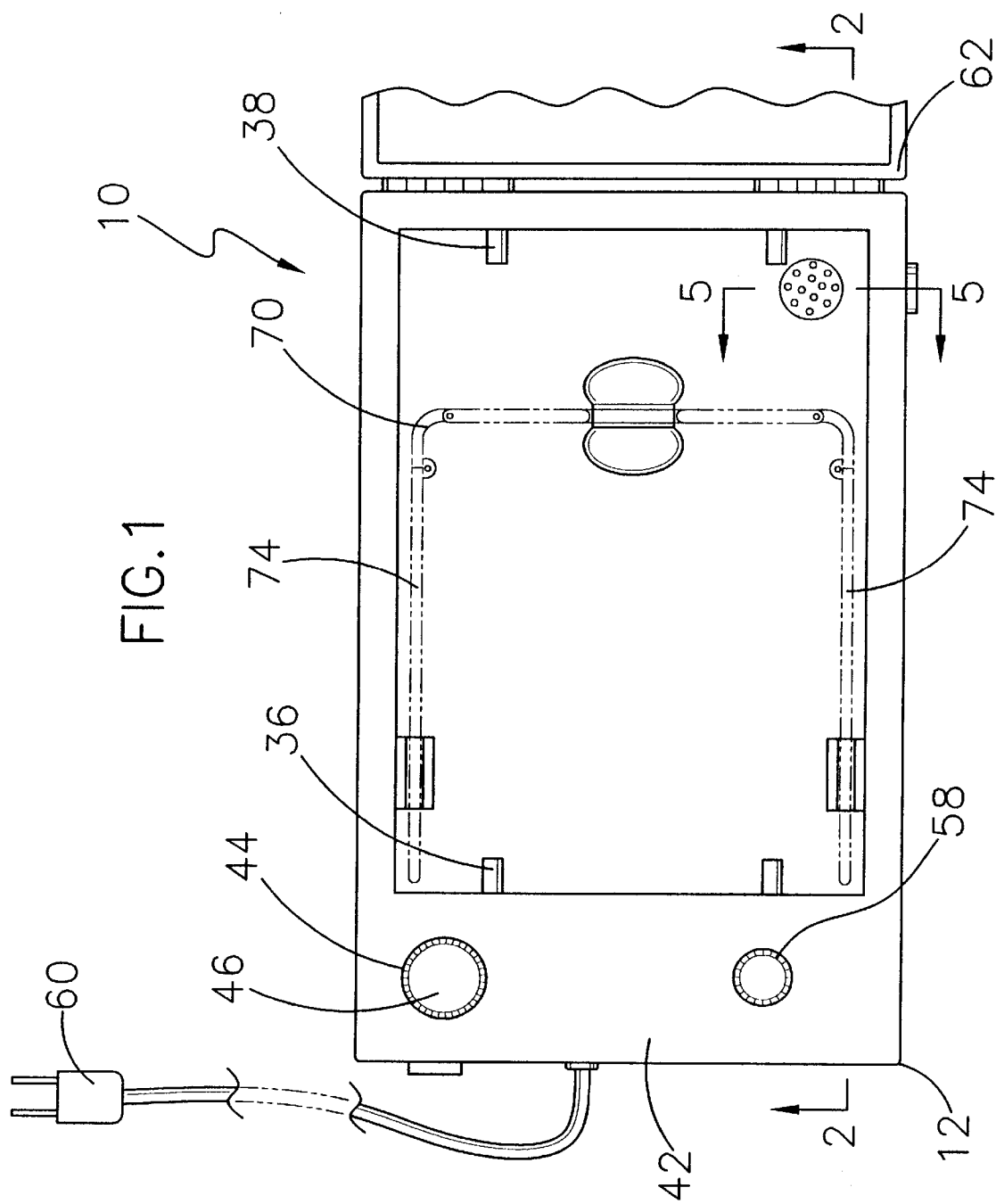
FIG. 1 is a schematic top view of a new eyewear cleaning apparatus according to the present invention.
Figure 2:
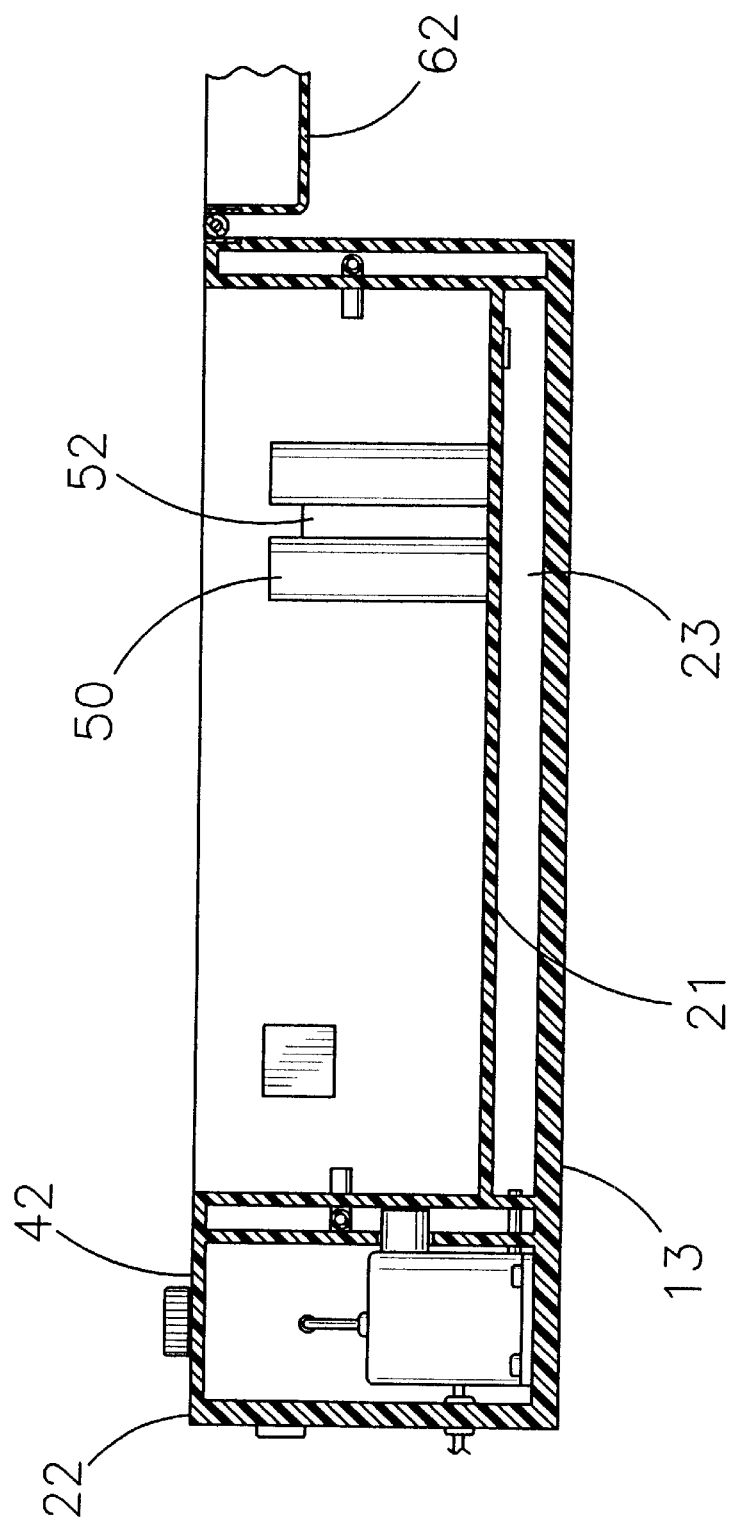
FIG. 2 is a schematic cross-sectional view taken along line 2—2 of FIG. 1 of the present invention.
Figure 3:
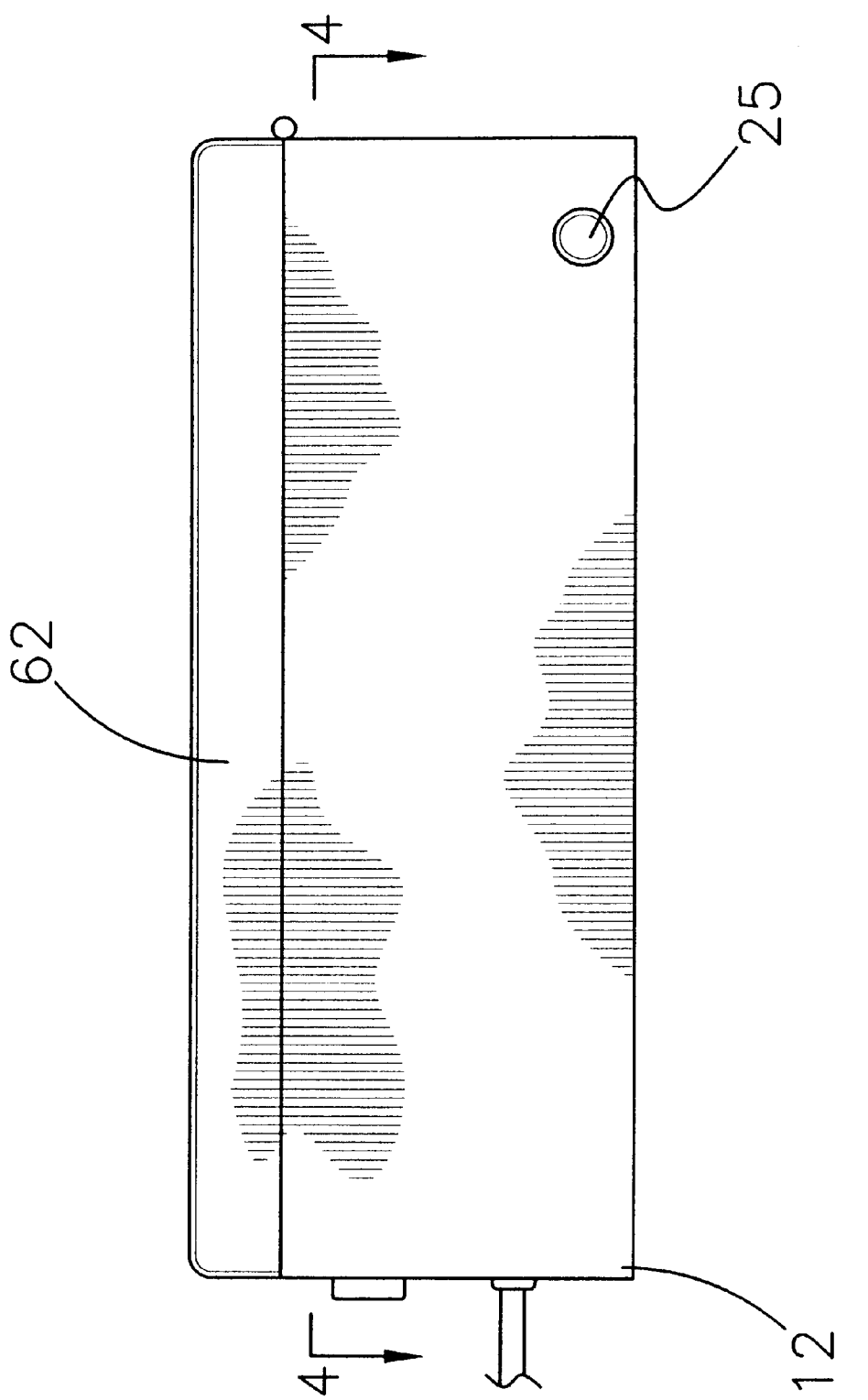
FIG. 3 is a schematic side view of the present invention.
Figure 4:
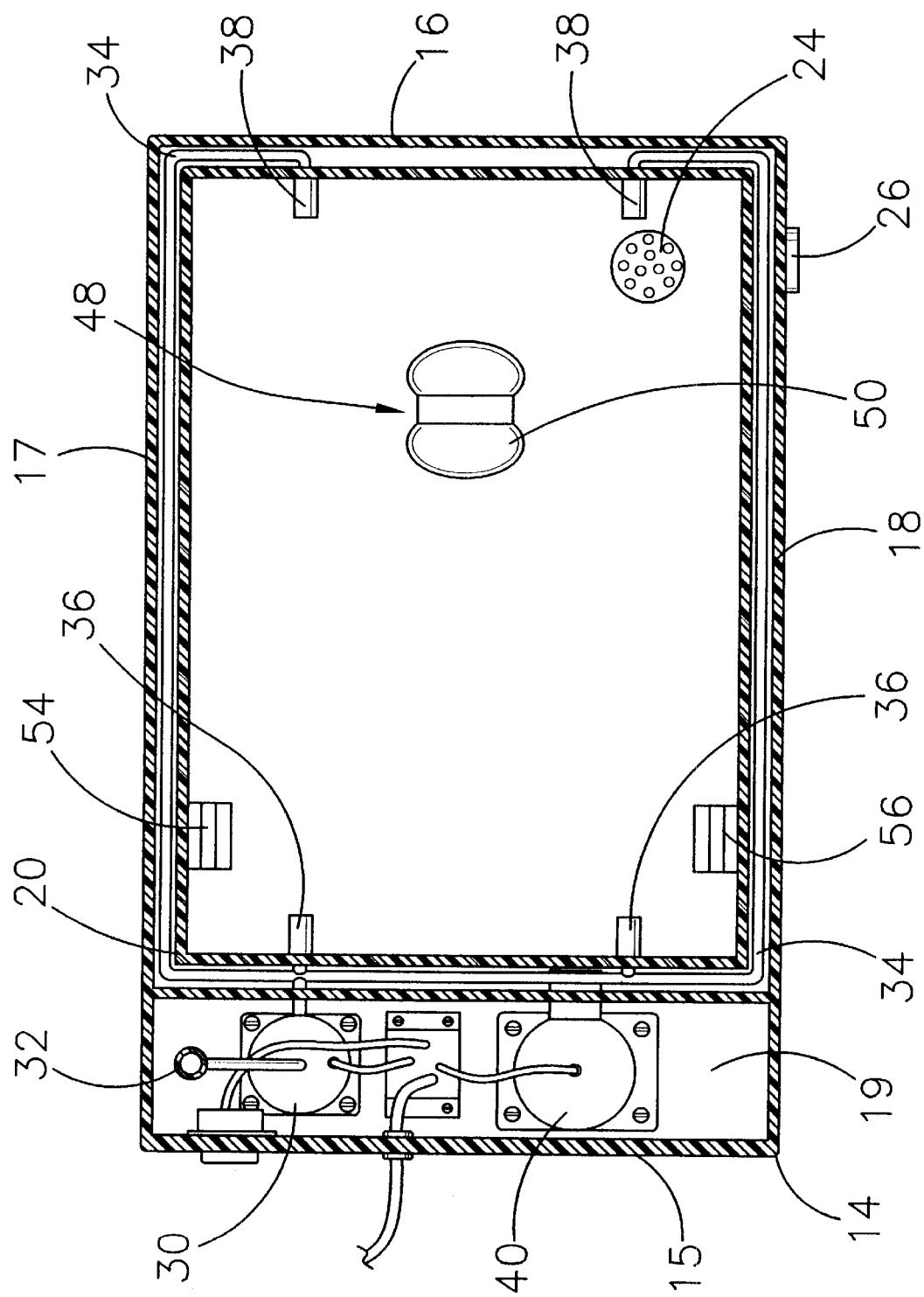
FIG. 4 is a schematic cross-sectional view taken along line 4—4 of FIG. 3 of the present invention.
Figure 5:
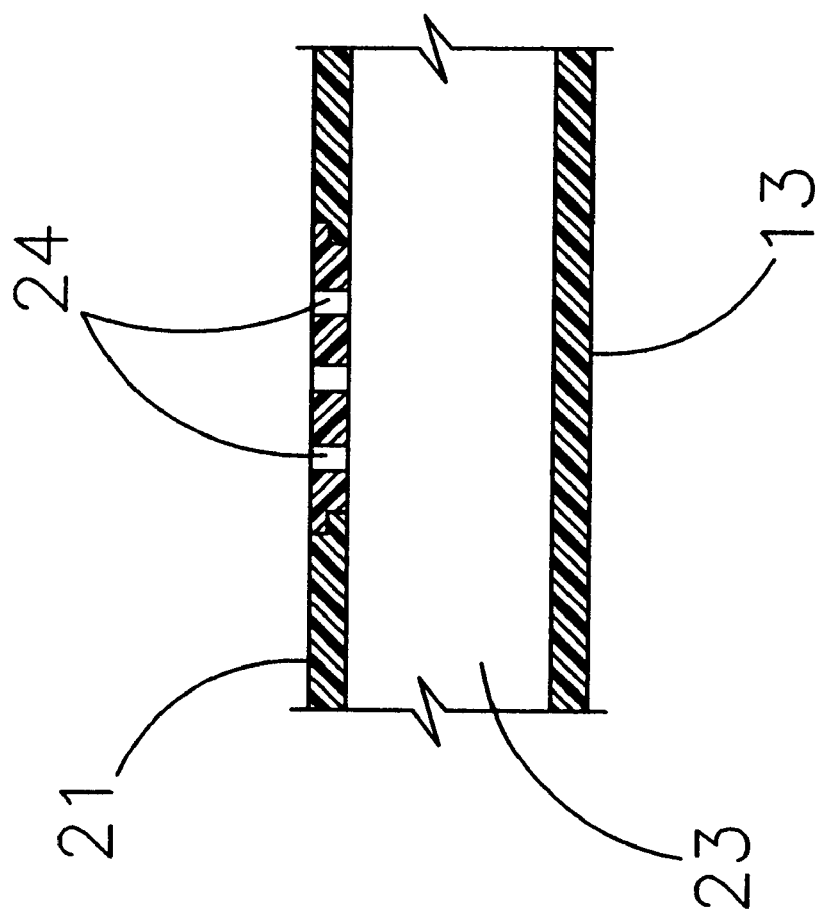
FIG. 5 is a schematic cross-sectional view taken along line 5—5 of FIG. 1 of the present invention.

With reference now to the drawings, and in particular to FIGS. 1 through 5 thereof, a new eyewear cleaning apparatus embodying the principles and concepts of the present invention and generally designated by the reference numeral 10 will be described.

As best illustrated in FIGS. 1 through 5, the eyewear cleaning apparatus 10 generally comprises a housing 12 having a bottom wall 13, and an outer wall 14 including a first end wall 15, a second end wall 16, a first side wall 17 and a second side wall 18 extending upwardly from the bottom wall 13. A compartment 19 is positioned in the housing 12 and is positioned adjacent to the first end wall 15. An inner perimeter wall 20 extends upwardly from the bottom wall 13 and extends around an interior of the housing 12 such that the inner perimeter wall 20 is spaced from the outer wall 14 and the compartment 19. An intermediate wall 21 is attached to an inner surface of the interior perimeter wall 20 and generally covers the bottom wall 13. The intermediate wall 21 is nearer the bottom wall 13 than a top edge 22 of the outer wall 14 such that a drainage space 23 is defined between the bottom wall 13 and the intermediate wall 21. The intermediate wall 21 has a plurality of apertures 24 therein extending into the drainage space. A hole 25 extends through the outer wall 14 and into the drainage space 23. A plug 26 is positionable in the hole 25.

A pump 30 is positioned in the compartment 19. The pump 30 is a conventional pump for pumping liquid. A container 32 for holding a fluid is positioned in the compartment 19 and is fluidly coupled to the pump 30. Cleaning solution may be placed into container 32.

A delivery pipe 34 is fluidly coupled to the pump 30 and extends around the space between the outer wall 14 and the inner perimeter wall 30. A first pair of nozzles 36 is in communication with the delivery pipe 34 and extends through the inner perimeter wall 20. The first pair of.nozzles 36 is spaced from each other and each extends toward the second end wall 16. A second pair of nozzles 38 is in communication with the delivery pipe 34 and extends through the inner perimeter wall 20. The second pair of nozzles 38 is spaced from each other and each extends toward the first end wall 15.

A blower 40 for blowing air through the delivery pipe 34 is positioned in the container 19 and is in fluid communication with the delivery pipe 34.

An upper wall 42 is attached to the upper edge 22 of the outer wall 14 and extends over the compartment 19 and the space between the inner perimeter wall 20 and the outer wall 14. An opening 44 extends through the upper wall 42 and into the container 19. A cap 46 is removably positioned over the opening 44.

A first mount 48 is positioned in the housing 12. The first mount 48 is attached to the intermediate wall 21 and is positioned generally between the first side wall 17 and the second side wall 18. The first mount 48 is located generally nearer the second end wall 16 than the first end wall 15. The first mount 48 is adapted for receiving a bridge portion 72 of eyewear 70 and includes a vertical member 50 having an indentation 52 therein for receiving the bridge 72.

A second mount 54 and a third mount 56 each is positioned in the housing 12. Each of the second 54 and third 56 mounts is attached to the inner peripheral wall 20. Each of the second 54 and third 56 mounts is positioned nearer the first end wall 15 than the second wall 16 and each is generally adjacent to one of the first 17 and second 18 side walls. The second 54 and third 56 mounts each comprise a bracket adapted for receiving one of the arms 74 of the eyewear 70.

An actuator 58 is operationally coupled to the pump 30 and the blower 40 for selectively turning on the pump 30 and the blower 40. The actuator 58 is operationally coupled to power supply 60.

A cover 62 is hingedly coupled to the upper edge 22 of the outer wall 14 for selectively opening and closing the housing 12.

In use the eyewear 70 is mounted in the housing 12 as shown in FIG. 1. The pump 30 forces cleaning fluid from the container 32 into the delivery pipe 34 so that it is sprayed on lenses of the eyewear 70. When finished, the blower 40 blows air on the eyewear 70 to dry them. The liquid used to clean the eyewear 70 drains into the drainage space 23. This is then drained through the hole 25 in the outer wall 14.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An eyewear cleaning device comprising:
   a housing having a bottom wall, and an outer wall including a first end wall, a second end wall, a first side wall and a second side wall extending upwardly from said bottom wall, a compartment being positioned in said housing and being positioned adjacent to said first end wall;
   a pump being positioned in said compartment;
   a container for holding a fluid being positioned in said compartment and being fluidly coupled to said pump;
   a delivery pipe being fluidly coupled to said pump and extending around the interior of the housing and being positioned adjacent to said outer wall and said container, a first pair of nozzles being in communication with said delivery pipe, said first pair of nozzles being spaced from each other and extending toward said second end wall, a second pair of nozzles being in communication with said delivery pipe, said second pair of nozzles being spaced from each other and extending toward said first end wall;
   an upper wall extending over said compartment and having an opening extending therethrough and into said container;
   a first mount being positioned in said housing and being adapted for receiving a bridge portion of the eyewear; and
   a cover being hingedly coupled to an upper edge of said outer wall for selectively opening and closing said housing.

2. The eyewear cleaning device as in claim 1, an inner perimeter wall extending upwardly from said bottom wall and extending around an interior of said housing such that said inner perimeter wall is spaced from said outer wall and said compartment, said delivery pipe being positioned between said inner wall and said outer wall, said nozzles extending through inner wall, said upper wall extending over the space between said inner wall and said outer wall.

3. The eyewear cleaning device as in claim 2, further including an intermediate wall being attached to an inner surface of said interior perimeter wall and generally covering said bottom wall, said intermediate wall being nearer said bottom wall than a top edge of said outer wall such that a drainage space is defined between said bottom wall and said intermediate wall, said intermediate wall having a plurality of apertures therein extending into said drainage space, a hole extending through said outer wall and into said drainage space.

4. The eyewear cleaning device as in claim 3, wherein said first mount is attached to said intermediate wall and being positioned generally between said first side wall and said second side wall, said first mount being located generally nearer said second end wall than said first end wall.

5. The eyewear cleaning device as in claim 4, further including a second mount and a third mount each being positioned in said housing, each of said second and third mounts being attached to said inner peripheral wall, each of said second and third mounts being positioned nearer said first end wall than said second wall and each being generally adjacent to one of said first and second side walls, each of said second and third mounts being adapted for receiving one of the arms of the eyewear.

6. The eyewear cleaning device as in claim 1, a blower for blowing air through said delivery pipe, said blower being positioned in said container and being in fluid communication with said delivery pipe.

7. The eyewear cleaning device as in claim 6, further including an actuator being operationally coupled to said pump and said blower for selectively turning on said pump and said blower, said actuator being operationally coupled to power supply.

8. An eyewear cleaning device comprising:
   a housing having a bottom wall, and an outer wall including a first end wall, a second end wall, a first side wall and a second side wall extending upwardly from said bottom wall, a compartment being positioned in said housing and being positioned adjacent to said first end wall, an inner perimeter wall extending upwardly from said bottom wall and extending around an interior of said housing such that said inner perimeter wall is spaced from said outer wall and said compartment, an intermediate wall being attached to an inner surface of said interior perimeter wall and generally covering said bottom wall, said intermediate wall being nearer said bottom wall than a top edge of said outer wall such that a drainage space is defined between said bottom wall and said intermediate wall, said intermediate wall having a plurality of apertures therein extending into said drainage space, a hole extending through said outer wall and into said drainage space;
   a pump being positioned in said compartment;

a container for holding a fluid being positioned in said compartment and being fluidly coupled to said pump;

a delivery pipe being fluidly coupled to said pump and extending around the space between said outer wall and said inner perimeter wall, a first pair of nozzles being in communication with said delivery pipe and extending through said inner perimeter wall, said first pair of nozzles being spaced from each other and extending toward said second end wall, a second pair of nozzles being in communication with said delivery pipe and extending through said inner perimeter wall, said second pair of nozzles being spaced from each other and extending toward said first end wall;

an upper wall being attached to said upper edge of said outer wall and extending over said compartment and said space between said inner perimeter wall and said outer wall, an opening extending through said upper wall and into said container, a cap being removably positioned over said opening;

a blower for blowing air through said delivery pipe, said blower being positioned in said container and being in fluid communication with said delivery pipe;

a first mount being positioned in said housing, said first mount being attached to said intermediate wall and being positioned generally between said first side wall and said second side wall, said first mount being located generally nearer said second end wall than said first end wall, said first mount being adapted for receiving a bridge portion of the eyewear;

a second mount and a third mount each being positioned in said housing, each of said second and third mounts being attached to said inner peripheral wall, each of said second and third mounts being positioned nearer said first end wall than said second wall and each being generally adjacent to one of said first and second side walls, each of said second and third mounts being adapted for receiving one of the arms of the eyewear;

an actuator being operationally coupled to said pump and said blower for selectively turning on said pump and said blower, said actuator being operationally coupled to power supply; and a cover being hingedly coupled to said upper edge of said outer wall for selectively opening and closing said housing.

* * * * *